(12) United States Patent
Compton et al.

(10) Patent No.: US 8,055,945 B2
(45) Date of Patent: Nov. 8, 2011

(54) SYSTEMS, METHODS AND COMPUTER PROGRAM PRODUCTS FOR REMOTE ERROR RESOLUTION REPORTING

(75) Inventors: Matthew Charles Compton, Durham, NC (US); Louis Daniel Echevarria, Tucson, AZ (US); Alain Asong Taku, Tucson, AZ (US); Richard Albert Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 12/364,393

(22) Filed: Feb. 2, 2009

(65) Prior Publication Data
US 2010/0199132 A1    Aug. 5, 2010

(51) Int. Cl.
*G06F 11/00* (2006.01)
(52) U.S. Cl. .................................... 714/26; 714/57
(58) Field of Classification Search ............. 714/26, 714/37, 38, 45, 46, 47, 157, 38.1, 574
See application file for complete search history.

(56) References Cited

U.S. PATENT DOCUMENTS

| | | | | |
|---|---|---|---|---|
| 5,040,227 A | 8/1991 | Lyke et al. | ......................... | 382/7 |
| 5,151,948 A | 9/1992 | Lyke et al. | ......................... | 382/7 |
| 5,638,384 A | 6/1997 | Hayashi et al. | .............. | 371/37.1 |
| 6,153,998 A | 11/2000 | Takakura | ....................... | 318/560 |
| 6,658,585 B1 * | 12/2003 | Levi | ................................... | 714/4 |
| 6,954,898 B1 | 10/2005 | Nakai et al. | ................... | 715/542 |
| 7,349,889 B1 * | 3/2008 | Alling et al. | .................... | 706/46 |
| 2009/0164853 A1 * | 6/2009 | Gokhale et al. | ................. | 714/57 |

OTHER PUBLICATIONS

Luby et al., "Mobile Data Broadcasting over MBMS Tradeoffs in Forward Error Correction" MUM'06, Dec. 4-6, 2006, Stanford, CA USA, p. 1-8.
Pomeranz et al., "On Error Correction in Macro-Based Circuits" International Conference on Computer Aided Design: Proceedings of the 1994 IEEE/ACM International Conference on Computer-aided design, p. 568-575, 1994.
Berger et al., "Reconstructing a Three-Dimensional Model with Arbitrary Errors" Journal of the ACM, vol. 46, No. 2, Mar. 1999, pp. 212-235.

\* cited by examiner

*Primary Examiner* — Dieu-Minh Le
(74) *Attorney, Agent, or Firm* — Zilka-Kotab, PC

(57) ABSTRACT

A method for reporting error resolution information according to one embodiment includes identifying an error; tracking information output to a user when attempting to resolve the error; and sending error resolution data to a remote system, the error resolution data comprising at least a representation of the error and at least a representation of some of the information output to the user. Additional systems, methods, and computer program products are also presented.

20 Claims, 4 Drawing Sheets

SYSTEMS, METHODS AND COMPUTER PROGRAM PRODUCTS FOR REMOTE ERROR RESOLUTION REPORTING

BACKGROUND

The present invention relates to procedure reporting and more particularly, this invention relates to collecting procedural data from multiple remote sites for future reference.

The process of error isolation and resolution can be quite challenging in multiple interconnected systems. Often, a plethora of solutions exist, causing the user attempting to resolve the issue to try many things before finally finding the proper solution.

What is needed is a way to gather relevant error resolution data for a given error, and provide relevant solutions to one attempting to resolve an error.

SUMMARY

A computer program product for reporting error resolution information according to one embodiment includes a computer usable medium having computer usable program code stored therewith. The computer usable program code includes computer usable program code configured to identify an error with respect to a subsystem; computer usable program code configured to track information output to a user when attempting to resolve the error; and computer usable program code configured to send error resolution data to a remote system, the error resolution data comprising at least a representation of the error and at least a representation of some of the information output to the user.

A method for reporting error resolution information according to one embodiment includes identifying an error; tracking information output to a user when attempting to resolve the error; and sending error resolution data to a remote system, the error resolution data comprising at least a representation of the error and at least a representation of some of the information output to the user.

A method for gathering error resolution information from a plurality of remote systems according to one embodiment includes receiving from multiple remote systems error resolution data comprising at least representations of an error and at least representations of some information output to users when attempting to resolve the error; storing the error resolution data; analyzing the error resolution data for determining which information is most relevant to resolution of the error; and sending to at least one of the remote systems, or to a user attempting to resolve a present error at the remote system, at least representations of the information determined to be most relevant to resolution of the error.

A system for gathering error resolution information from a plurality of remote systems in one embodiment includes a processor; a network interface in communication with the processor, the network interface enabling coupling to a network; and a computer usable medium in communication with the processor and having computer usable program code embodied therewith. The computer usable program code includes computer usable program code configured to receive from multiple remote systems error resolution data comprising at least representations of an error and at least representations of some information output to users when attempting to resolve the error; computer usable program code configured to store the error resolution data; computer usable program code configured to analyze the error resolution data for determining which information is most relevant to resolution of the error; and computer usable program code configured to send to at least one of the remote systems, or to a user attempting to resolve a present error at the remote system, at least representations of the information determined to be most relevant to resolution of the error.

Other aspects and embodiments of the present invention will become apparent from the following detailed description, which, when taken in conjunction with the drawings, illustrate by way of example the principles of the invention.

DETAILED DESCRIPTION

Figure 1:
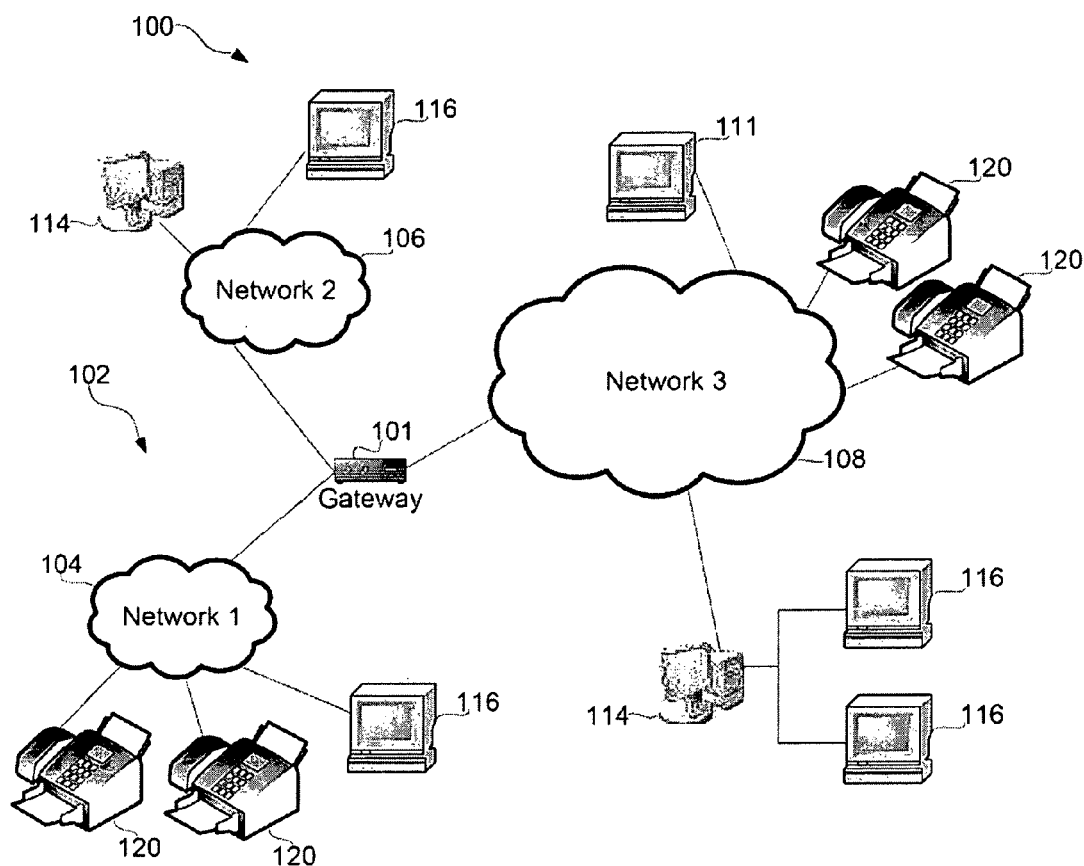
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems, methods and computer program products for gathering and storing information such as procedures from remote sites. Such information may then be used for future reference. Some embodiments are particularly adapted for use in servicing computer-based installations. For example, in one embodiment, when a fault occurs in one of the subsystems of a larger overall system, the affected subsystem queries an information center data base and maps possible problem resolutions steps that may help to specifically address the fault. When there is a human interaction with the affected system, there may be a dynamic feedback mechanism to record specific steps of corrective actions and new tips that the user was able to use to successfully address the fault. This information may be automatically updated in the database of the information with a specific error code assigned to the fault with this specific root cause of failure. The stored information may be helpful in the future as it may streamline steps of the procedure needed to address the fault with additional updates to make the fault resolution procedure robust by using successful recommended steps that have been tallied from previous users' corrective actions.

In one general embodiment, a system, method and computer program product for reporting error resolution information are provided. The method includes identifying an error with respect to a subsystem; tracking information output to a user when attempting to resolve the error; and sending error resolution data to a remote system, the error resolution data comprising at least a representation of the error and at least a representation of some of the information output to the user.

In another general embodiment, a system, method and computer program product for gathering error resolution information from a plurality of remote systems is provided. The method includes receiving from multiple remote systems error resolution data comprising at least representations of an error and at least representations of some information output to users when attempting to resolve the error; storing the error resolution data; analyzing the error resolution data for determining which information is most relevant to resolution of the error; and sending to at least one of the remote systems, or to a user attempting to resolve a present error at the remote system, at least representations of the information determined to be most relevant to resolution of the error.

As will be appreciated by one skilled in the art, the present invention may be embodied as a system, method or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc. may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
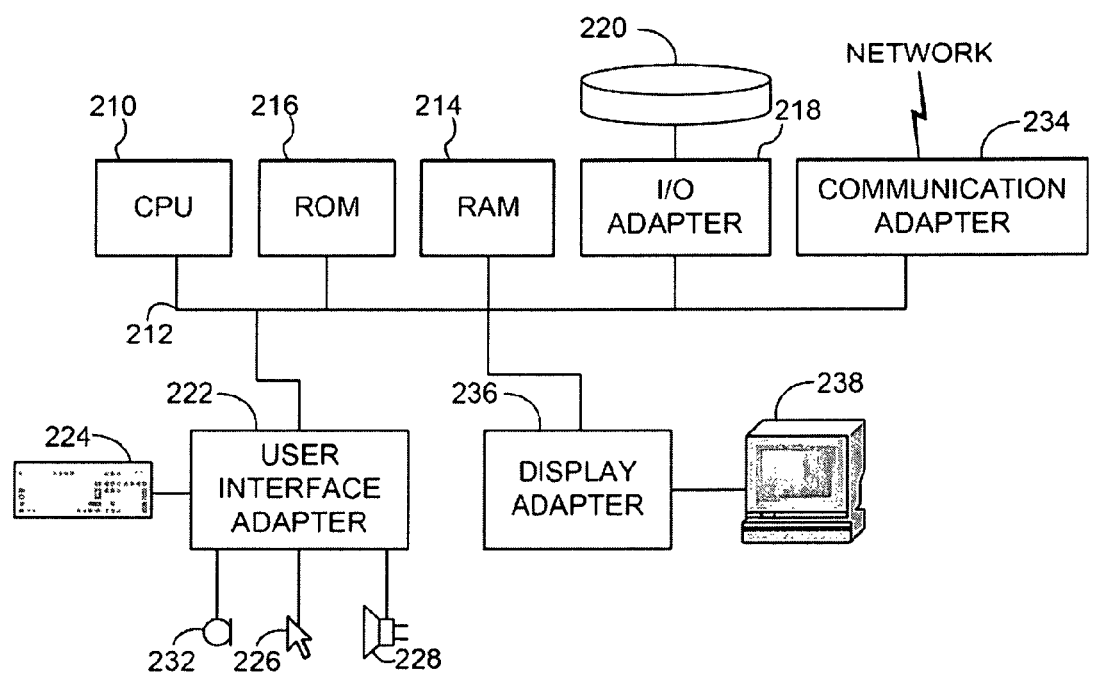
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Embodiments of the present invention address the redundancies that exist in information acquisition for corrective actions that are needed to resolve an error, e.g., a fault, on a subsystem of a larger system, e.g., servers 114 of the system 100 of FIG. 1. The process of error isolation and resolution can be quite challenging in multiple interconnected systems.

Accordingly, in one embodiment, error resolution data such as information viewed, procedures taken, etc. to resolve an error may be gathered by each subsystem and forwarded to a central repository, where it may be combined with similar information from other subsystems and analyzed to determine the best solution to the error. This will be helpful in the future as it will streamline steps of the procedure needed to address the fault with additional updates to make the fault resolution procedure robust by using successful recommended steps that have been tallied from previous users' corrective actions.

Figure 3:
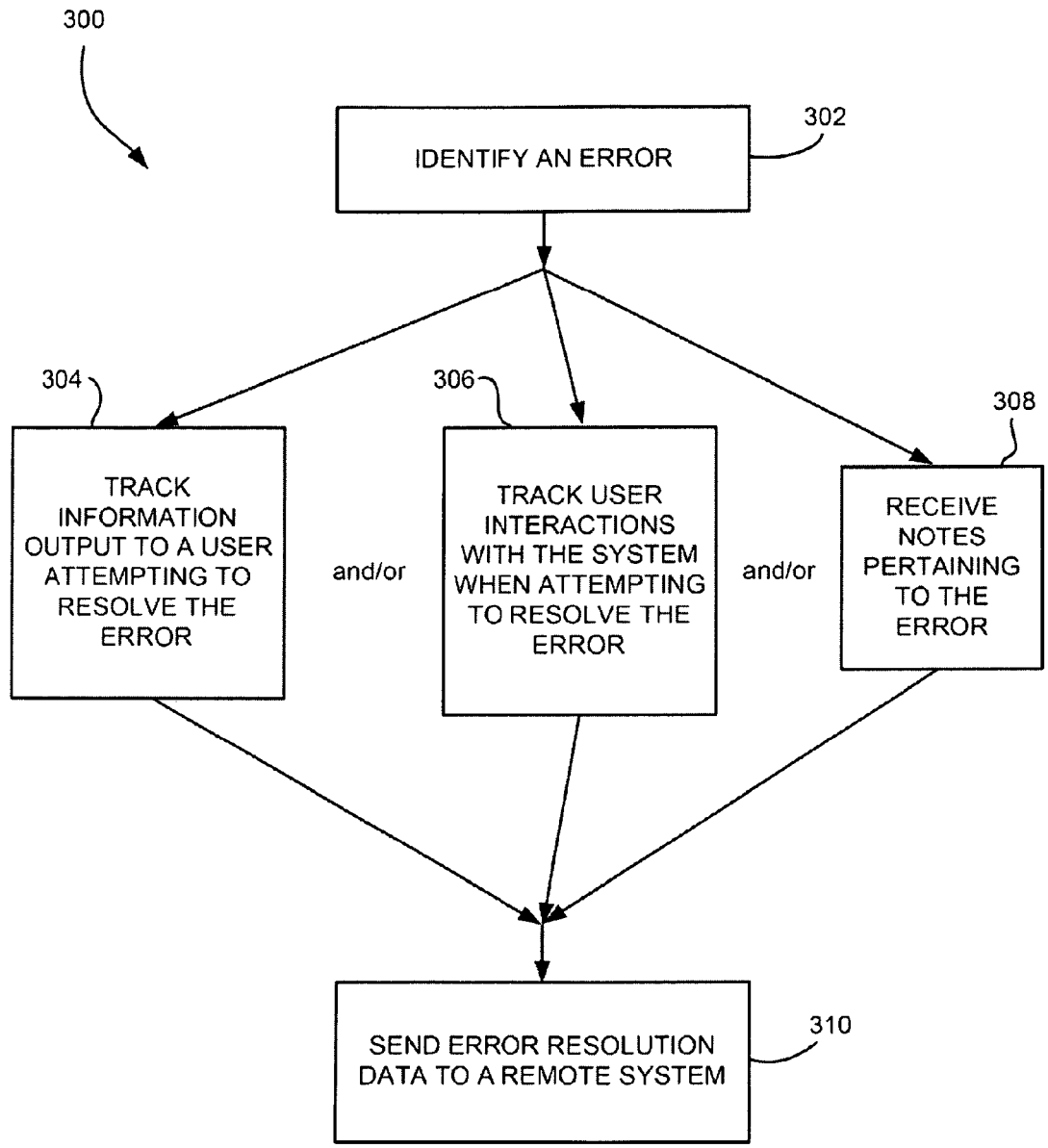
FIG. 3 is a flow diagram of a method in accordance with one embodiment.

FIG. 3 illustrates a method 300 for reporting error resolution information. This method may be performed by each subsystem. As an option, the present method 300 may be implemented in the context of the functionality of FIGS. 1-2. Of course, however, the method 300 may be implemented in any desired environment.

In operation 302, an error is identified. The error may be any error, such as a software error, hardware error, network connectivity error, etc. Identification of the error may be done automatically, may be based on user input, etc. Typically, the error has a fault code associated with it.

In operation 304, information output to a user attempting to resolve the error is tracked. The information may include any information that may be useful for resolving the error, such as troubleshooting guides, product manuals, previously-tried error resolution procedures, chats, emails, message board posts, videos, etc. Further, such information may include error resolution data compiled by a remote system, as discussed in more detail below. Any capture mechanism may be used. For instance, in one approach, the user requests for information are tracked to extract the identity of the information. In another approach, the information may be identified as it is output.

When there is a human interaction with the affected system, a dynamic feedback mechanism may be provided to record specific steps of corrective actions and new tips that the user was able to use to successfully address the error. Such information may be automatically updated in the database of the information at the remote system with some association with the error, such as a specific error code assigned to the fault with the specific root cause of failure.

Accordingly, in operation 306 user interactions with the system having the error that are performed when attempting to resolve the error may be tracked and associated with the representation of the error and the representation of the information output to the user. A representation of at least some of the user interactions may also be sent to the remote system, e.g., as part of the error resolution data. Illustrative user interactions include changing settings, installing patches or drivers, replacing hardware, reinstalling software, disabling components, etc.

Moreover, in operation 308, notes pertaining to the error may be received from the user and associated with the representation of the error wherein the notes are sent to the remote system.

As an option, the information output to the user during resolution of the error, or representation of the information, may be shown to the user to solicit feedback on the relevance of the information, e.g., what worked and/or what did not. User input selecting some of the information as most helpful, least helpful, etc. may be received. Moreover, the error resolution data sent to the remote site may include the user input, may be filtered based on the user input, etc.

In addition to the automatic tracking of what topics a user uses to resolve the error, the tracking mechanism may record the order in which the topics are viewed. In the case that there are multiple steps on multiple components that need to be followed, the user may be presented with the procedural documents in the correct order. Once finished, a user may be able to manually flag sections in procedural order to strengthen the automatic association.

In one approach, error resolution procedures may be recorded by the subsystem in a procedures database. A table similar to Table 1, below, may be used:

TABLE 1

| ActionID | DataID | Topic | Date/Time |
|---|---|---|---|
| 003 | 78-12cg87 | Online/Offline V06 | Jun. 1, 2008 00:00:01 |
| 003 | 78-12cg87 | Remove/Replace V06 Adapter | Jun. 1, 2008 00:03:45 |
| 003 | 78-12cg87 | Online/Offline V06 | Jun. 1, 2008 00:10:15 |
| 003 | 78-12cg87 | Running System Checkout V06 | Jun. 1, 2008 00:14:26 |
| 003 | 78-12cg87 | Clearing AIX Error Log V06 | Jun. 1, 2008 00:45:06 |

The remote system may have the association between the DataID and the errorID associated with the failure. Those identifiers can then be used to propagate the error resolution procedure to all the subsystems in the field reporting this problem.

In operation 310, error resolution data is sent to a remote system, the error resolution data comprising at least a representation of the error, e.g., error code, and at least a representation of the information gathered in operations 304, 306 and/or 308. Note that the representation can include, for example, the name or title of the error or information, a code associated with the error or information, the actual information output to the user or portion thereof, a link or path to the information, etc.

The error resolution data thus sent to the remote system may be used to generate a solution strategy and/or guide that may assist in resolution of the same or similar error. Thus, the subsystem may query the remote system for error resolution data upon identifying an error. For example, each time a fault occurs in one of the subsystems, the affected subsystem may query the remote system and map possible problem resolutions steps that will help to specifically address the fault. Moreover, the error resolution steps performed to resolve the error may again be tracked and reported to the remote system to further improve error resolution. More information about the function of the remote system is presented below.

In one illustrative embodiment, for a given failure, the error symptom and topics read by the user during a repair action may be tracked by the subsystem and sent back to remote system. Usage statistics may then be propagated back out to the field so that the subsystems at other sites have the most used sections identified and in procedural order for any given error.

Figure 4:
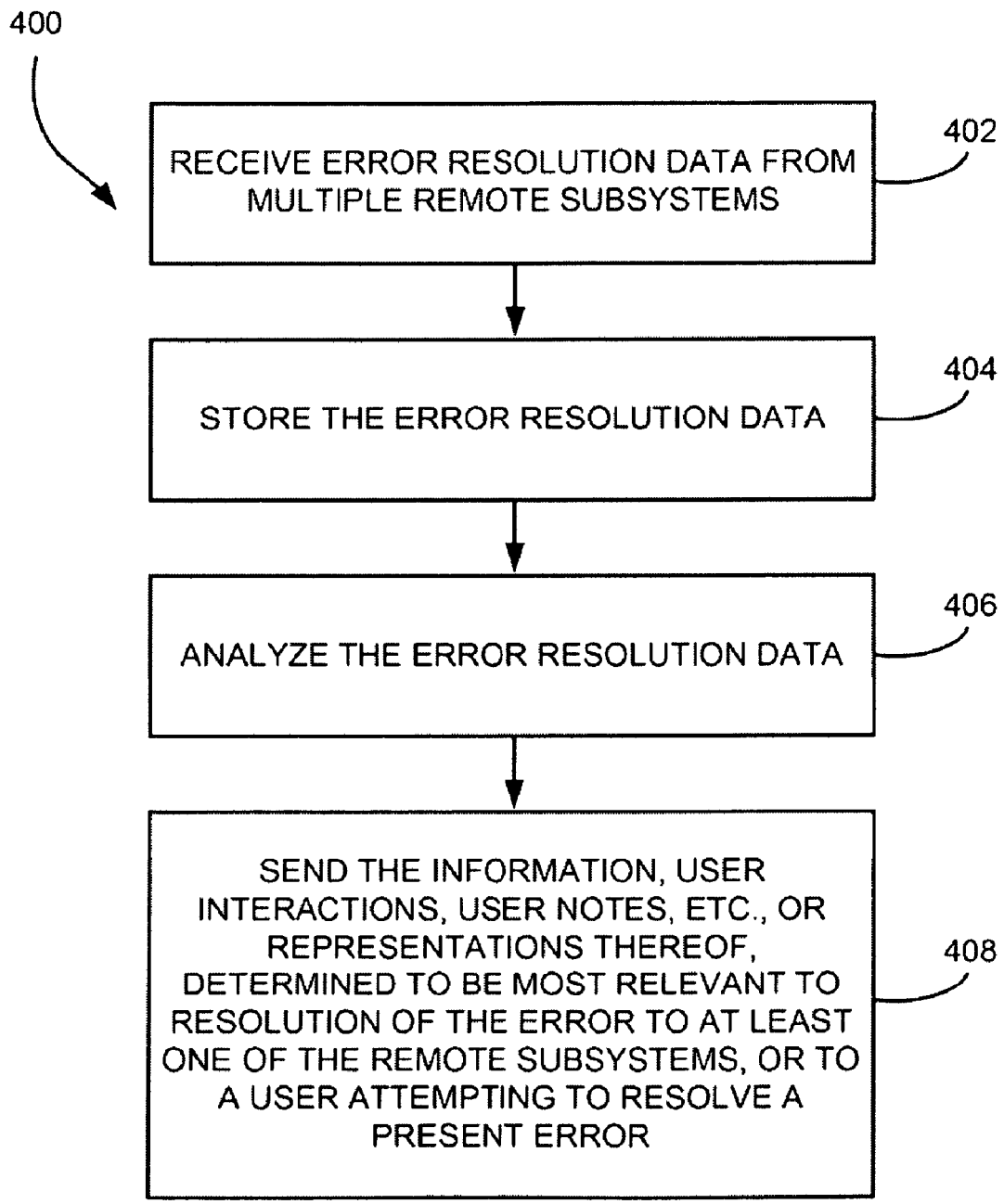
FIG. 4 is a flow diagram of a method in accordance with one embodiment.

The remote system gathers and analyzes the error resolution data from the various subsystems. FIG. 4 depicts a method 400 for gathering error resolution information from a plurality of remote subsystems. As an option, the present method 400 may be implemented in the context of the functionality of FIGS. 1-3. Of course, however, the method 400 may be implemented in any desired environment.

In operation 402, error resolution data is received from multiple remote subsystems. The error resolution data may be any of the information mentioned above. For example, the error resolution data may include at least representations of an error and at least representations of some of the information output to users when attempting to resolve the error, user interactions performed when attempting to resolve the error, user notes pertaining to the error, etc.

In operation 404, the error resolution data is stored, e.g., in a database, a table, etc. residing on a storage devices such as a disk drive, tape drive, RAID array, tape library, etc.

In operation 406, the error resolution data is analyzed. In one approach, the analysis includes determining which information viewed by the users when resolving the errors is most relevant to resolution of the error. The analysis may also include determining which user interactions are most relevant to resolution of the error.

The analysis may also include a statistical analysis. In one approach, analyzing the error resolution data includes determining a frequency of output of the information to users attempting to resolve the error. The pieces of information selected most frequently by users may be highly relevant to the usefulness of the information.

The analysis of the error resolution data may further include considering such things as an order in which the information was accessed by the users attempting to resolve the error.

Moreover, the analysis of the error resolution data may include prioritizing the portions of the error resolution data having user feedback associated therewith. Procedures that do not have direct user input on usefulness may still be sent to the remote system automatically, but may be given a lower priority than those sorted manually in the field. General purpose procedures, such as code installs and the like, may be tracked by the subsystem, sent to the remote system, and then automatically propagated to the field subsystems for use any time by the site user.

In operation 408, the information, user interactions, user notes, etc., or representations thereof, determined to be most relevant to resolution of the error is sent to at least one of the remote subsystems, or to a user attempting to resolve a present error, e.g., presently occurring error, at the remote system. The information, etc. may be sent using any known technique including network protocols, email, etc.

The information, etc. may be sent to the subsystem upon occurrence of an event, such as upon receiving a notification from the one of the remote systems that the remote system is experiencing the error. In this way, the latest, and presumably most relevant, resolution information pertaining to the error may be sent. Note that the notification can include information about the error, e.g., the error code.

In another approach, the error resolution data may be analyzed and the information, etc. determined to be most relevant to resolution of the error is sent each time error resolution data is received.

The particular format that the information, etc. is sent in may vary. In one particularly preferred approach, the information, etc. sent is ordered based on relevance to resolution of the error.

Throughout the development and testing phases for a new product, developers and tester may address problem conditions using the remote system in this manner to populate the procedure database before the product ships. Throughout the lifecycle of the product, the most common problems and procedure would become strongly associated, making the most probable solution for a given problem and the procedure to fix the problem immediately available to users.

In one illustrative embodiment, a user may be able to specify that they are working on a problem associated with a particular error code. The subsystem may log all of the topics viewed and relate them to the error that prompted the user action. When the user has completed the repair, he or she can look at his or her viewing history and flag the topics that were important or useful in the order they were used. When finished, the rankings flagged by the user may be sent to the remote system where they may be associated with the error code corresponding to the failure. In the future, when a subsystem reports an error to the remote system, the remove system, having recognized that it has procedure entries from the field for that failure, will send the procedures to the reporting subsystem, making the procedures available to the user not only on the remote system but at the subsystem reporting the failure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for reporting error resolution information, the computer program product comprising:
   a computer usable medium having computer usable program code stored therewith, the computer usable program code comprising:
   computer usable program code configured to identify an error;
   computer usable program code configured to track information output to a user when the user attempts to resolve the error; and computer usable program code configured to send error resolution data to a remote system, the error resolution data comprising at least a representation of the error and at least a representation of some of the information output to the user during the user attempt to resolve the error.

2. The computer program product of claim 1, further comprising computer usable program code configured to track user interactions performed when attempting to resolve the error, and computer usable program code configured to associate the user interactions with the error, wherein a representation of at least some of the user interactions is sent to the remote system.

3. The computer program product of claim 2, wherein an order in which the user interactions are performed is tracked.

4. The computer program product of claim 1, further comprising computer usable program code configured to receive notes pertaining to the error from the user, and computer usable program code configured to associate the notes with the error, wherein the notes are sent to the remote system.

5. The computer program product of claim 1, further comprising computer usable program code configured to receive user input selecting some of the information for indicating a relevance thereof to the error.

6. The computer program product of claim 1, further comprising computer usable program code configured to query the remote system for error resolution data upon identifying the error.

7. The computer program product of claim 1, wherein an order that the information is output to the user is tracked and sent to the remote system.

8. A method for reporting error resolution information to a remote system, the method comprising:
   identifying an error with respect to a subsystem;
   tracking information output to a user when attempting to resolve the error; and
   sending error resolution data to the remote system, the error resolution data comprising at least a representation of the error and at least a representation of some of the information output to the user.

9. The method of claim 8, further comprising tracking user interactions performed when attempting to resolve the error, and associating the user interactions with the error, wherein a representation of at least some of the user interactions is sent to the remote system, wherein an order in which the user interactions are performed is tracked.

10. The method of claim 8, further comprising querying the remote system for error resolution data upon identifying the error.

11. A method for gathering error resolution information from a plurality of remote systems, the method comprising:
   receiving from multiple remote systems error resolution data comprising at least representations of an error and at least representations of some information output to users when attempting to resolve the error;
   storing the error resolution data;
   analyzing the error resolution data for determining which information is most relevant to resolution of the error; and
   sending to at least one of the remote systems, or to a user attempting to resolve a present error at the remote system, at least representations of the information determined to be most relevant to resolution of the error.

12. The method of claim 11, wherein the error resolution data further comprises user interactions performed when attempting to resolve the error, analyzing the error resolution data for determining which user interactions are most relevant to resolution of the error, and sending to the remote system, or to a user attempting to resolve the present error at the remote system, representations of at least the user interactions determined to be most relevant to resolution of the error.

13. The method of claim 11, wherein the error resolution data includes user notes pertaining to the error, and further comprising sending at least some of the notes to the remote system, or to a user attempting to resolve the present error at the remote system.

14. The method of claim 11, further comprising receiving a notification from the one of the remote systems that the remote system is experiencing the error, wherein the representations of at least the information determined to be most relevant to resolution of the error is sent after receiving the notification.

15. The method of claim 11, wherein the error resolution data is analyzed and the representations of at least the information determined to be most relevant to resolution of the error is sent each time error resolution data is received.

16. The method of claim 11, wherein analyzing the error resolution data includes determining a frequency of output of the information to users attempting to resolve the error.

17. The method of claim 11, wherein analyzing the error resolution data includes considering an order in which the information was accessed by the users attempting to resolve the error.

18. The method of claim 11, wherein analyzing the error resolution data includes prioritizing the portions of the error resolution data having user feedback associated therewith.

19. The method of claim 11, wherein the at least representations of the information sent is ordered based on relevance to resolution of the error.

20. A system for gathering error resolution information from a plurality of remote systems, the system comprising:
   a processor;
   a network interface in communication with the processor, the network interface enabling coupling to a network;
   a computer usable medium in communication with the processor and having computer usable program code embodied therewith, the computer usable program code comprising:
      computer usable program code configured to receive from multiple remote systems error resolution data comprising at least representations of an error that occurred on the remote systems and at least representations of some information output to users when the users attempted to resolve the error;
      computer usable program code configured to store the error resolution data;
      computer usable program code configured to analyze the received error resolution data for determining which information is most relevant to resolution of the error; and
      computer usable program code configured to send to at least one of the remote systems, or to a user attempting to resolve a present error at the remote system, at least representations of the information determined to be most relevant to resolution of the present error.

* * * * *